US011342563B2

(12) United States Patent
Jiang et al.

(10) Patent No.: US 11,342,563 B2
(45) Date of Patent: May 24, 2022

(54) THREE-DIMENSIONAL SOFT ELECTRODE FOR LITHIUM METAL BATTERIES

(71) Applicant: ARIZONA BOARD OF REGENTS ON BEHALF OF ARIZONA STATE UNIVERSITY, Scottsdale, AZ (US)

(72) Inventors: Hanqing Jiang, Chandler, AZ (US); Wei Zeng, Mesa, AZ (US); Xu Wang, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 178 days.

(21) Appl. No.: 16/614,067

(22) PCT Filed: Apr. 13, 2018

(86) PCT No.: PCT/US2018/027483
§ 371 (c)(1),
(2) Date: Nov. 15, 2019

(87) PCT Pub. No.: WO2018/212871
PCT Pub. Date: Nov. 22, 2018

(65) Prior Publication Data
US 2021/0050601 A1 Feb. 18, 2021

Related U.S. Application Data

(60) Provisional application No. 62/506,994, filed on May 16, 2017.

(51) Int. Cl.
*H01M 4/80* (2006.01)
*H01M 4/134* (2010.01)
(Continued)

(52) U.S. Cl.
CPC .......... *H01M 4/808* (2013.01); *H01M 4/134* (2013.01); *H01M 4/1395* (2013.01);
(Continued)

(58) Field of Classification Search
CPC .... H01M 4/134; H01M 4/1395; H01M 4/382; H01M 4/661; H01M 4/667; H01M 4/70;
(Continued)

(56) References Cited

U.S. PATENT DOCUMENTS 7,521,292 B2   4/2009   Rogers
7,557,367 B2   7/2009   Rogers
(Continued)

FOREIGN PATENT DOCUMENTS

EP           1761104 A1    3/2007
WO     WO2009126544 A1    10/2009
(Continued)

OTHER PUBLICATIONS

Jia et al., "Failure mechanics of a wrinkling thin film anode on a substrate under cyclic charging and discharging," Extreme Mechanics Letters, Mar. 10, 2016, 8:273-282.
(Continued)

*Primary Examiner* — Brittany L Raymond
(74) *Attorney, Agent, or Firm* — Fish & Richardson P.C.

(57) ABSTRACT

An electrode includes a soft substrate, a metal layer in direct contact with the soft substrate, and a lithium layer formed directly on the metal layer, wherein the metal layer comprises wrinkles. The wrinkles are of a substantially uniform height, and the height is in a range of 100 nm to 20 μm. The wrinkles are typically separated by a substantially uniform distance, and the distance is in a range of 100 nm to 1000 μm. The wrinkles may be one dimensional or two dimensional. Fabricating an electrode includes forming a metal layer on a soft substrate, and forming a lithium layer on the
(Continued)

metal layer. Forming the lithium layer on the metal layer yields uniform wrinkles in the metal layer. A battery may include the electrode as described.

22 Claims, 13 Drawing Sheets

(51) Int. Cl.
   *H01M 4/1395* (2010.01)
   *H01M 4/38* (2006.01)
   *H01M 4/66* (2006.01)
   *H01M 4/02* (2006.01)

(52) U.S. Cl.
   CPC ........... *H01M 4/382* (2013.01); *H01M 4/661* (2013.01); *H01M 4/667* (2013.01); *H01M 2004/021* (2013.01)

(58) Field of Classification Search
   CPC ........... H01M 4/808; H01M 2004/021; H01M 10/052; Y02E 60/10
   See application file for complete search history.

(56) References Cited

U.S. PATENT DOCUMENTS

| | | | |
|---|---|---|---|
| 7,622,367 | B1 | 11/2009 | Nuzzo |
| 7,799,699 | B2 | 9/2010 | Nuzzo |
| 7,858,156 | B2 | 12/2010 | Crosby |
| 8,198,621 | B2 | 6/2012 | Rogers |
| 8,217,381 | B2 | 7/2012 | Rogers |
| 8,637,185 | B2 | 1/2014 | Berdichevsky |
| 8,685,201 | B2 | 4/2014 | Rourke |
| 8,792,169 | B2 | 7/2014 | Jiang |
| 9,706,646 | B2 | 7/2017 | Jiang |
| 10,153,519 | B2 | 12/2018 | Jiang |
| 10,418,664 | B2 | 9/2019 | Jiang |
| 10,502,991 | B2 | 12/2019 | Yu |
| 10,660,200 | B2 | 5/2020 | Jiang |
| 2002/0020053 | A1 | 2/2002 | Fonash |
| 2002/0187398 | A1* | 12/2002 | Mikhaylik ......... H01M 4/0407 429/234 |
| 2003/0113481 | A1 | 6/2003 | Huang |
| 2005/0003263 | A1 | 1/2005 | Mallari |
| 2008/0076267 | A1 | 3/2008 | Oishi |
| 2008/0261116 | A1 | 10/2008 | Burton |
| 2009/0009675 | A1 | 1/2009 | Cho |
| 2010/0003544 | A1 | 1/2010 | Pijnenburg |
| 2010/0143677 | A1 | 6/2010 | Lee |
| 2013/0115512 | A1 | 5/2013 | Jiang |
| 2014/0199518 | A1 | 7/2014 | Yu |
| 2015/0152566 | A1 | 6/2015 | Zhang |
| 2016/0126554 | A1 | 5/2016 | Beneventi |
| 2017/0338453 | A1 | 11/2017 | Yu |

FOREIGN PATENT DOCUMENTS

| | | |
|---|---|---|
| WO | WO2011113038 A2 | 9/2011 |
| WO | WO2014113489 A1 | 7/2014 |
| WO | WO2015100414 A1 | 7/2015 |
| WO | WO2016049444 A1 | 3/2016 |
| WO | WO2016073584 A1 | 5/2016 |
| WO | WO2016109652 A1 | 7/2016 |

OTHER PUBLICATIONS

Liu et al., "3D Porous Sponge-Inspired Electrode for Stretchable Lithium-Ion Batteries," Advanced Materials, 2016, 28(18):3578-3583.

PCT International Search Report and Written Opinion in International Appln. No. PCT/US2018/027483, dated Feb. 1, 2019, 11 pages.

PCT International Preliminary Report on Patentability in International Appln. No. PCT/US2018/027483, dated Nov. 19, 2019, 8 pages.

Aurbach et al., "A Comparative Study of Synthetic Graphite and Li Electrodes in Electrolyte Solutions Based on Ethylene Carbonate-Dimethyl Carbonate Mixtures," Journal of The Electrochemical Society, Dec. 1996, 143(12):3809-3820.

Aurbach et al., "Identification of surface films formed on lithium in propylene carbonate solutions," Journal of The Electrochemical Society, Jul. 1987, 134(7):1611-1620.

Aurbach et al., "Impedance spectroscopy of lithium electrodes: Part 1. General behavior in propylene carbonate solutions and the correlation to surface chemistry and cycling efficiency," Journal of Electroanalytical Chemistry, Apr. 15, 1993, 348(1-2):155-179.

Aurbach et al., "Recent studies of the lithium-liquid electrolyte interface Electrochemical, morphological and spectral studies of a few important systems," Journal of Power Sources, Mar. 1995, 54(1):76-84.

Boukamp et al., "All-Solid Lithium Electrodes with Mixed-Conductor Matrix," Journal of The Electrochemical Society, 1981, 128(4):725-729.

Bowden et al., "Spontaneous formation of ordered structures in thin films of metals supported on an elastomeric polymer," Nature, May 14, 1998, 393:146-149.

Chan et al., "High-performance lithium battery anodes using silicon nanowires," Nature Nanotechnology, Dec. 2007, 3(1):31-35.

Chan et al., "Structural and electrochemical study of the reaction of lithium with silicon nanowire," Journal of Power Sources, Dec. 2008, 189(1):34-39.

Che et al., "Carbon nanotubule membranes for electrochemical energy storage and production," Nature, May 28, 1998, 393:346-349.

Chu et al., "Selective deposition and stable encapsulation of lithium through heterogeneous seeded growth," Nature Energy, Feb. 22, 2016, 1(16010):1-8.

Ding et al., "Dendrite-Free Lithium Deposition via Self-Healing Electrostatic Shield Mechanism," Journal of the American Chemical Society, Feb. 2013, 135(11):4450-4456.

Dong et al., "Insight into enhanced cycling performance of Li—O2 batteries based on binary CoSe2/CoO nanocomposite electrodes," The Journal of Physical Chemistry Letters, Jan. 21, 2014, 5:615-621.

Dudley et al., "Conductivity of electrolytes for rechargeable lithium batteries," Journal of Power Sources, 1991, 35:59-82.

Fernandes et al., "Flexible PDMS—based dry electrodes for electro-optic acquisition of ECG signals in wearable devices," Presented at the 32nd Annual International Conference of the IEEE EMBS, Buenos Aires, Argentina, Aug. 31-Sep. 4, 2010, pp. 3503-3506.

Gireaud et al., "Lithium metal stripping/plating mechanisms studies: A metallurgical approach," Electrochemistry Communications, Aug. 30, 2006, 8:1639-1649.

Graetz et al., "Highly reversible lithium storage in nanostructured silicon," Electrochemical and Solid State Letters, Jul. 2003, 6(9):A194-A197.

Hirai et al., "Effect of additives on lithium cycling efficiency," Journal of The Electrochemical Society, 1994, 141:2300-2305.

Huang et al., "Nonlinear analyses of wrinkles in a film bonded to a compliant substrate," Journal of Mech. Physicals Solids, Sep. 2005, 53(9):2101-2118.

Huang, "Kinetic wrinkling of an elastic film on a viscoelastic substrate," Journal of Mechanics and Physics of Solids, Aug. 2004, 53(1):63-89.

Ishikawa et al., "In situ scanning vibrating electrode technique for the characterization of interface between lithium electrode and electrolytes containing additives," Journal of The Electrochemical Society, Dec. 1994, 141:L159-L161.

Jiang et al., "Finite Deformation Mechanics in Buckled Thin Films on Compliant Supports," Proceedings of the National Academy of Sciences of the United States of America, Oct. 7, 2007, 104(40):15607-15612.

Jiang et al., "Finite width effect of thin-films buckling on compliant substrate: Experimental and theoretical studies," Journal of the Mechanics and Physics of Solids, Mar. 2008, 56(8):2585-2598.

(56) References Cited

OTHER PUBLICATIONS

Jiang et al., "Mechanics of Precisely Controlled Thin Film Buckling on Elastomeric Substrate," Applied Physics Letters, Mar. 2007, 90(133119):3 pages.

Jiang et al., "Post-buckling analysis for the precisely controlled buckling of thin film encapsulated by elastomeric substrates," International Journal of Solids and Structures, Dec. 2007, 45(7):2014-2023.

Khang et al., "A stretchable form of single-crystal silicon for high-performance electronics on rubber substrates," Science, Jan. 13, 2006, 311:208-212.

Kim et al., "All-water-based electron-beam lithography using silk as a resist," Nature Nanotechnology, Mar. 23, 2014, 9:306-310.

Kim et al., "Characterization of the interface between $LiCoO_2$ and $Li_7La_3Zr_2O_{12}$ in an all-solid-state rechargeable lithium battery," Journal of Power Sources, Aug. 1, 2010, 196:764-767.

Kim et al., "Mechanically compliant and lithium dendrite growth-suppressing composite polymer electrolytes for flexible lithium-ion batteries," Journal of Materials Chemistry A, Mar. 2013, 1:4949-4955.

Kim et al., "Spinel $LiMn_2O_4$ Nanorods as Lithium Ion Battery Cathodes," Nano Letters, Oct. 2008, 8(11):3948-3952.

Lee et al., "A simple composite protective layer coating that enhances the cycling stability of lithium metal batteries," Journal of Power Sources, Mar. 5, 2015, 284:103-108.

Li et al., "A high capacity nano-Si composite anode material for lithium rechargeable batteries," Electrochemical and Solid State Letters, Sep. 1999, 2(11):547-549.

Li et al., "A review of lithium deposition in lithium-ion and lithium metal secondary batteries," Journal of Power Sources, Jan. 4, 2014, 254:168-182.

Lin et al., "Layered reduced graphene oxide with nanoscale interlayer gaps as a stable host for lithium metal anodes," Nature Nanotechnology, Mar. 21, 2016, 11:626-632.

Liu et al., "Extending the Life of Lithium-Based Rechargeable Batteries by Reaction of Lithium Dendrites with a Novel Silica Nanoparticle Sandwiched Separator," Advanced Materials, Nov. 2016, 29(4):1603987, 6 pages.

Liu et al., "Lithium Metal Anodes with an Adaptive "Solid-Liquid" Interfacial Protective Layer," Journal of the American Chemical Society, Mar. 2017, 139(13):4815-4820.

Liu et al., "Lithium-coated polymeric matrix as a minimum volume-change and dendrite-free lithium metal anode," Nature Communications, Mar. 18, 2016, 7(1099):1-9.

Lu et al., "Free-Standing Copper Nanowire Network Current Collector for Improving Lithium Anode Performance," Nano Letters, Jun. 2, 2016:4431-4437.

Matsuda, "Stable electrolytes for lithium batteries," Journal of Power Sources, 1987, 20:19-26.

Mayers et al., "Suppression of dendrite formation via pulse charging in rechargeable lithium metal batteries," The Journal of Physical Chemistry C, Nov. 19, 2012, 116:26214-26221.

Murugan et al., "Fast Lithium Ion Conduction in Garnet-Type $Li_7La_3Zr_2O_{12}$," Angewandte Chemie International Edition, Oct. 4, 2007, 46(41):7778-7781.

Safari et al., "Kinetics of oxygen reduction in aprotic Li—$O_2$ cells: a model-based study," The Journal of Physical Chemistry Letters, Sep. 22, 2014, 5:3486-3491.

Schechter et al., "X-ray Photoelectron spectroscopy study of surface films formed on Li electrodes freshly prepared in Alkyl carbonate solutions," Langmuir, Mar. 31, 1999, 15:3334-3342.

Seh et al., "Designing high-energy lithium-sulfur batteries," Chemical Society Reviews, 2016, 45:5605-5634.

Song et al., "An Analytical Study of Two-Dimensional Buckling of Thin Films on Compliant Substrates," Journal of Appl. Physical, 2008, 103(L014303):1-11.

Sun et al., "Controlled Buckling of Semiconductor Nanoribbons for Stretchable Electronics," Nature Nanotechnology, Dec. 2006, 1:201-207.

Takeda et al., "Lithium Dendrite Formation on a Lithium Metal Anode from Liquid, Polymer and Solid Electrolytes," Electrochemistry, Apr. 2016, 84(4):210-218.

Tu, "Irreversible-Processes of Spontaneous Whisker Growth in Bimetallic Cu—Sn Thin-Film Reactions," Physical Review B, 1994, 49:2030-2034.

Valvesonline.com.au [online], "Elastomer Properties," aviable on or before Mar. 23, 2015, via Internet Archive: Wayback Machine URL: <https://web.archive.org/web/20150323161621/https://www.valvesonline.com.au/references/elastomer-properties>, retreived on Apr. 15, 2021, URL <https://www.valvesonline.com.au/references/elastomer-properties>, 3 pages.

Vaughey et al., "Alternative anode materials for lithium-ion batteries: a study of $Ag_3Sb$," Journal of Power Sources, 2003, 119:64-68.

Wang et al., "Local versus global buckling of thin films on elastomeric substrates," Applied Physics Letters, Jul. 2008, 93(2):023126, 3 pages.

Wang et al., "Crosslinking effect on polydimethylsiloxane elastic modulus measured by custom-built compression instrument," Journal of Applied Polymer Science, 2014, 131(22):1-4.

Wu et al., "Improving battery safety by early detection of internal shorting with a bifunctional separator," Nature Communications, Oct. 13, 2014, 5(5193):1-6.

Xu et al., "Lithium metal anodes for rechargeable batteries," Energy & Environmental Science, 2014 7:513-537.

Yamaki et al., "A consideration of the morphology of electrochemically deposited lithium in an organic electrolyte," Journal of Power Sources, 1998, 74:219-227.

Yan et al., "Ultrathin two-dimensional atomic crystals as stable interfacial layer for improvement of lithium metal anode," Nano Letters, 2014, 14:6016-6022.

Yang et al., "Accommodating lithium into 3D current collectors with a submicron skeleton towards long-life lithium metal anodes," Nature Communications, Aug. 24, 2015, 6(8058):1-9.

Yang et al., "Fabrication of a Hydrophilic Poly(dimethylsiloxane) Microporous Structure and Its Application to Portable Microfluidic Pump," Japanese Journal of Applied Physics, 2010, 49:1-5.

Yu et al., "A stretchable temperature sensor based on elastically buckled thin film devices on elastomeric substrates," Applied Physics Letters, Oct. 2009, 95(141912):1-4.

Yu et al., "Silicon Thin Films as Anodes for High-Performance Lithium-Ion Batteries with Effective Stress Relaxation," Advanced Energy Materials, 2012, 2:68-73.

Yu et al., "Stretchable Supercapacitors Based on Buckled Single-Walled Carbon Nanotube Macrofilms," Advanced Materials, Dec. 2009, 21(47):4793-4797.

Yun et al., "Chemical Dealloying Derived 3D Porous Current Collector for Li Metal Anodes," Advanced Materials, 2016, 28:6932-6939.

Zhamu et al., "Reviving rechargeable lithium metal batteries: enabling next-generation high-energy and high-power cells," Energy & Environmental Science, 2012, 5:5701-5707.

Zheng et al., "Interconnected hollow carbon nanospheres for stable lithium metal anodes," Nature Nanotechnology, 2014, 9:618-623.

PCT International Search Report and Written Opinion in International Appln. No. PCT/US2011/028271, dated Nov. 24, 2011, 5 pages.

Ruffo et al., "Impedance Analysis of Silicon Nanowire Lithium Ion Battery Anodes," Journal of Physical Chemistry C, Jun. 2009, 113(26):11390-11398.

Liu et al., "3D Porous Sponge-Inspired Electrode for Stretchable Lithium-Ion Batteries," Advanced Materials, Mar. 15, 2016, 28:3578-3583.

\* cited by examiner

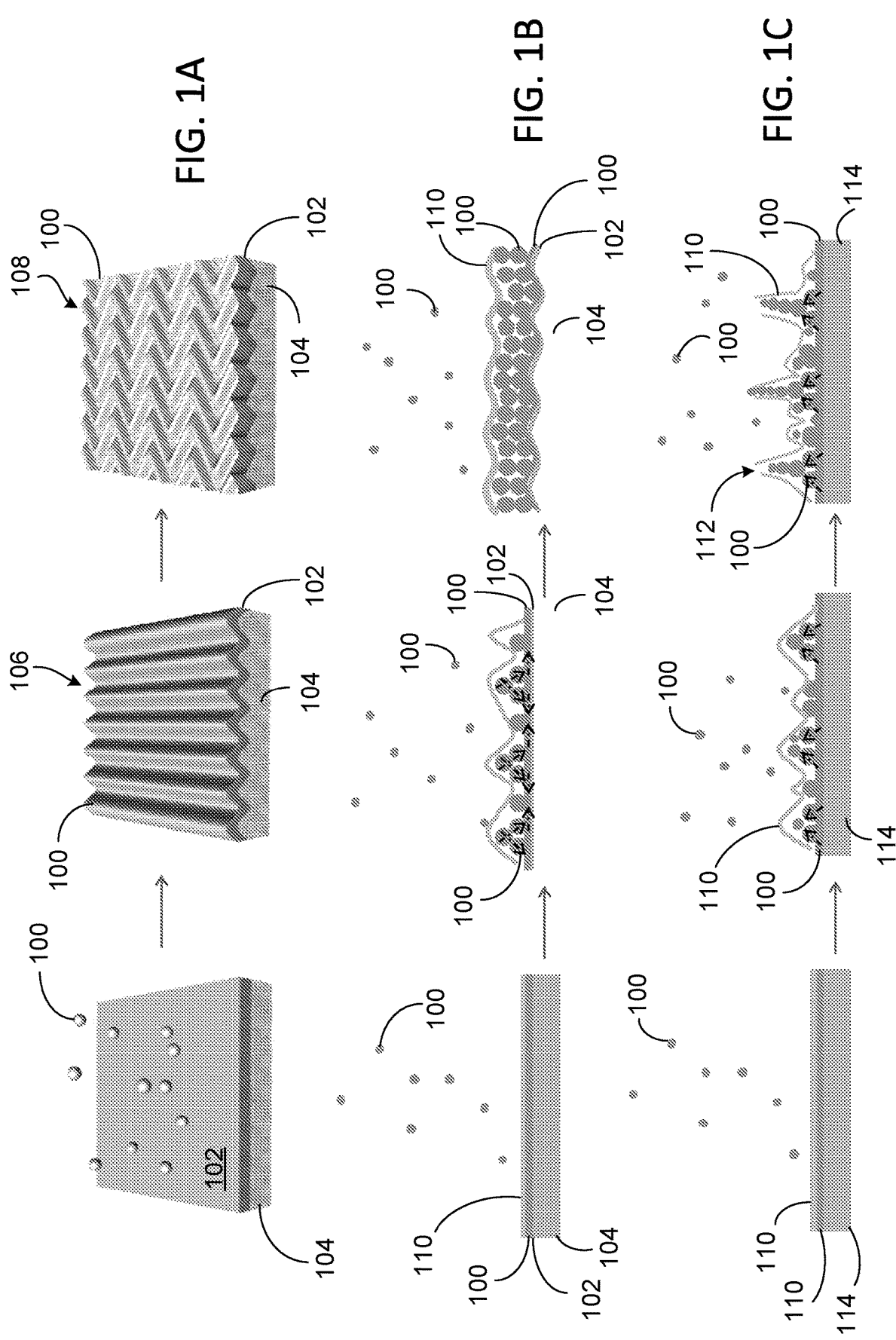

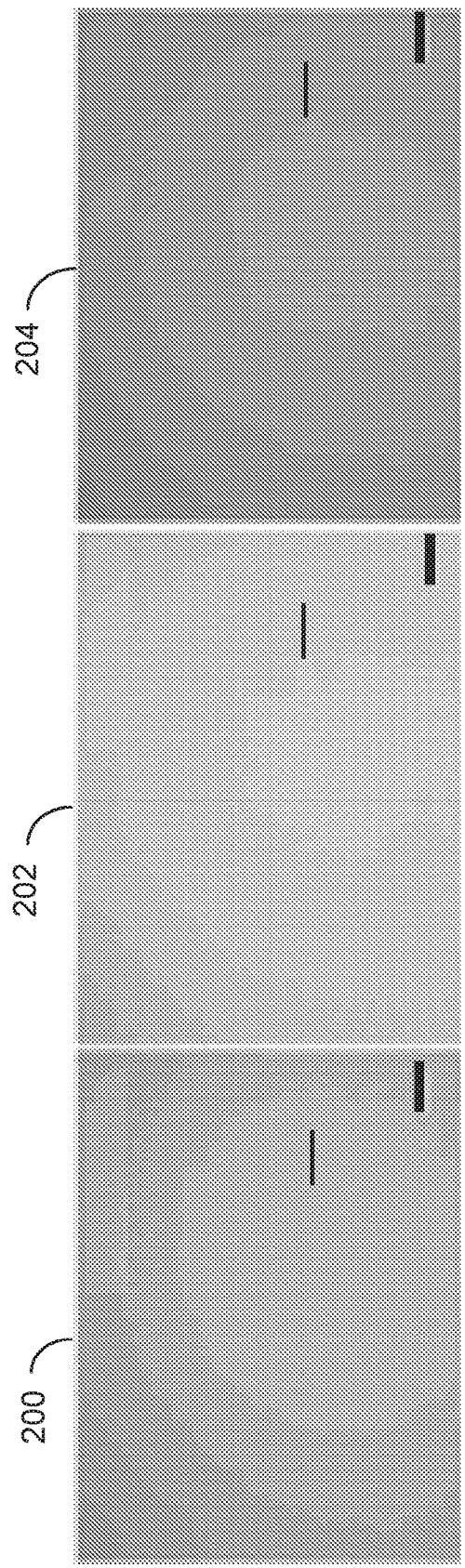
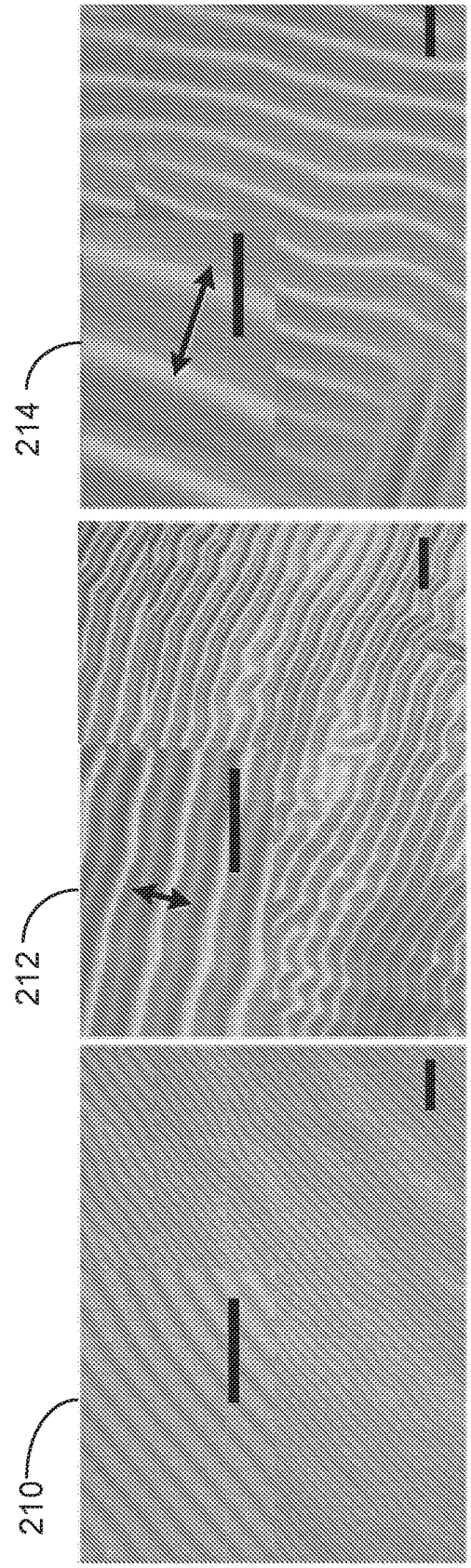
FIG. 2A  FIG. 2B  FIG. 2C
FIG. 2D  FIG. 2E  FIG. 2F

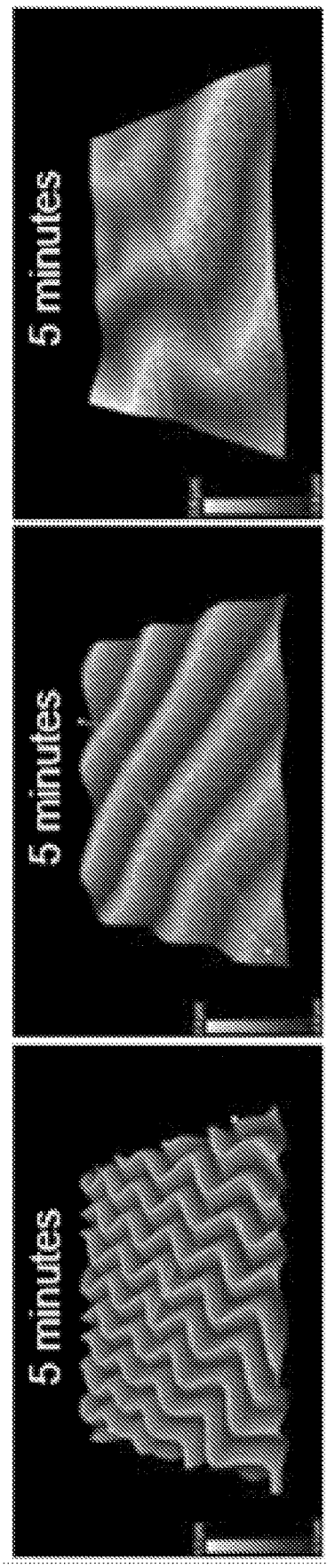
FIG. 2J
FIG. 2K
FIG. 2L
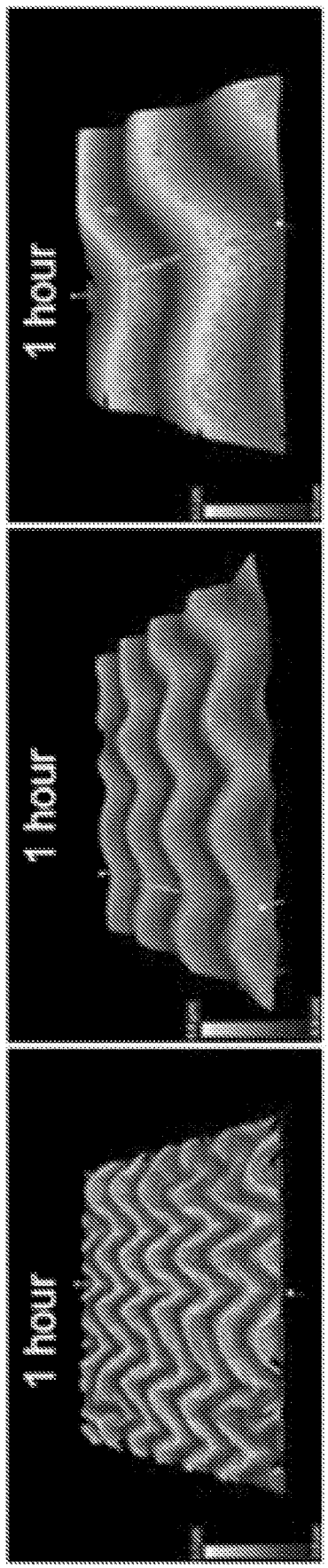
FIG. 2M
FIG. 2N
FIG. 2O

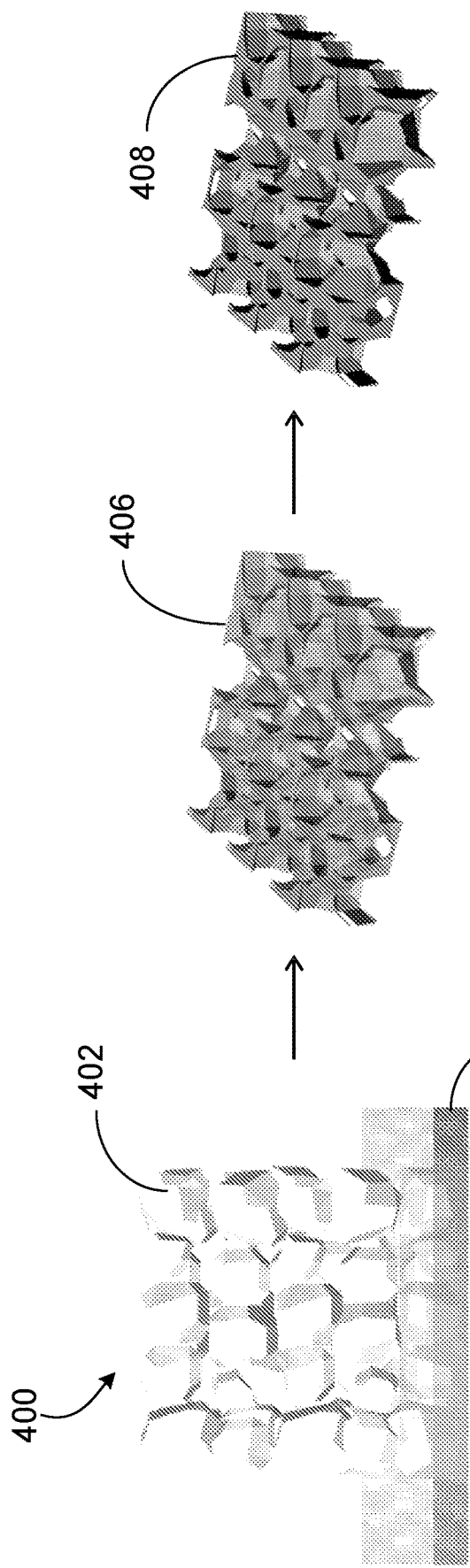

THREE-DIMENSIONAL SOFT ELECTRODE FOR LITHIUM METAL BATTERIES

CROSS-REFERENCE TO RELATED APPLICATIONS

This application is a U.S. National Stage Application under 35 USC § 371 and claims the benefit of International Patent Application No. PCT/US2018/027483 filed on Apr. 13, 2018 entitled "THREE-DIMENSIONAL SOFT ELECTRODE FOR LITHIUM METAL BATTERIES," which claims the benefit of U.S. Provisional Patent Application No. 62/506,994 entitled "THREE-DIMENSIONAL SOFT ELECTRODE FOR LITHIUM METAL BATTERIES" filed May 16, 2017, both of which are incorporated herein by reference in their entirety.

TECHNICAL FIELD

This invention relates to a three-dimensional (3D) soft electrode for lithium metal batteries.

BACKGROUND

In recent years, lithium (Li) metal-based rechargeable batteries including Li-sulfur (S), Li-air and Li-selenium (Se) batteries are making a strong comeback and being actively pursued for the fast development of electric vehicles and grid storage because of their much higher energy densities compared with Li-ion batteries. For example, the energy density of Li—S batteries can reach ~2,500 Wh/kg or 2,800 Wh/$L^2$, compared to less than 420 Wh/kg or 1,400 Wh/L for Li-ion batteries. However, Li dendrites that grow during plating and stripping pose safety concerns and tend to penetrate separators lead to capacity decay by consuming both lithium and electrolyte.

SUMMARY

In a first general aspect, an electrode includes a soft substrate, a metal layer in direct contact with the soft substrate, and a lithium layer formed directly on the metal layer, wherein the metal layer comprises wrinkles.

Implementations of the first general aspect may include one or more of the following features.

The soft substrate is three dimensional. The soft substrate may have thickness of about 25 μm or about 50 μm to about 100 μm, about 250 μm, about 500 μm, or about 1000 μm. The soft substrate may be elastic, flexible, or both. The soft substrate typically has an elastic modulus in a range of 100 kPa to 100 MPa. Examples of suitable soft substrates include polydimethylsiloxane, silicone, polyurethane, natural rubber, nitrile ethylene-propylene, and styrene-butadiene. The soft substrate defines pores, and the metal layer is formed on surfaces defining the pores.

The metal layer includes at least one of copper, nickel, iron, silver, platinum, and gold. A thickness of the metal layer is typically in a range of 50 nm to 1 μm, 50 nm to 500 nm, or 50 nm to 100 nm. The metal layer is formed on the soft substrate.

The wrinkles are of a substantially uniform height, and the height is in a range of 100 nm to 20 μm. The wrinkles are typically separated by a substantially uniform distance, and the distance is in a range of 100 nm to 1000 μm. The wrinkles may be one dimensional or two dimensional.

A thickness of the lithium layer is typically in a range of 50 nm to 20 μm.

In a second general aspect, fabricating an electrode includes forming a metal layer on a soft substrate, and forming a lithium layer on the metal layer, wherein forming the lithium layer on the metal layer yields uniform wrinkles in the metal layer.

In a third general aspect, a battery includes a first electrode, a second electrode, and an electrolyte in contact with the first electrode and the second electrode. The second electrode includes a soft substrate, a metal layer in direct contact with the soft substrate, and a lithium layer formed on the metal layer, wherein the metal layer includes wrinkles.

Implementations of the third general aspect may include one or more of the following features.

The first electrode may include lithium. The metal layer includes at least one of copper, nickel, iron, silver, platinum, and gold. The wrinkles are one dimensional or two dimensional, and the soft substrate is three dimensional. The soft substrate defines pores, and the metal layer is formed on surfaces defining the pores. A dimension of the pores is in a range of 5 nm to 500 μm.

BRIEF DESCRIPTION OF THE DRAWINGS

FIGS. 1A and 1B depict wrinkling of copper thin film during lithium plating. FIG. 1C depicts lithium dendrite formation on copper foil.

FIGS. 4A-4C depict formation of a copper-plated porous three-dimensional (3D) soft substrate.

FIG. 5A is a comparison of porous PDMS substrates with a thickness of 300 μm (right) vs 50 μm (left). FIG. 5B is a top view of a 50 μm-thick porous PDMS substrate showing reduced pore size. All scale bars represent 100 μm.

FIG. 6A is a 2 mAh $cm^{-2}$ capacity loading cell under a current density of 2 mA $cm^{-2}$. FIG. 6B is a 3 mAh $cm^{-2}$ capacity loading cell under a current density of 3 mA $cm^{-2}$.

FIGS. 7A-7C are cross-sectional SEM images of a planar copper current collector in its pristine state (A), after first lithiation (B) and after 100 cycles (C). FIGS. 7D-7F are cross-sectional SEM images of a 3D 300 μm-thick Cu@PDMS substrate in its pristine state (D), after first lithiation (E) and after 100 cycles (F). The scale bar is 50 μm.

DETAILED DESCRIPTION

Figures 2G, 2H, 2I:
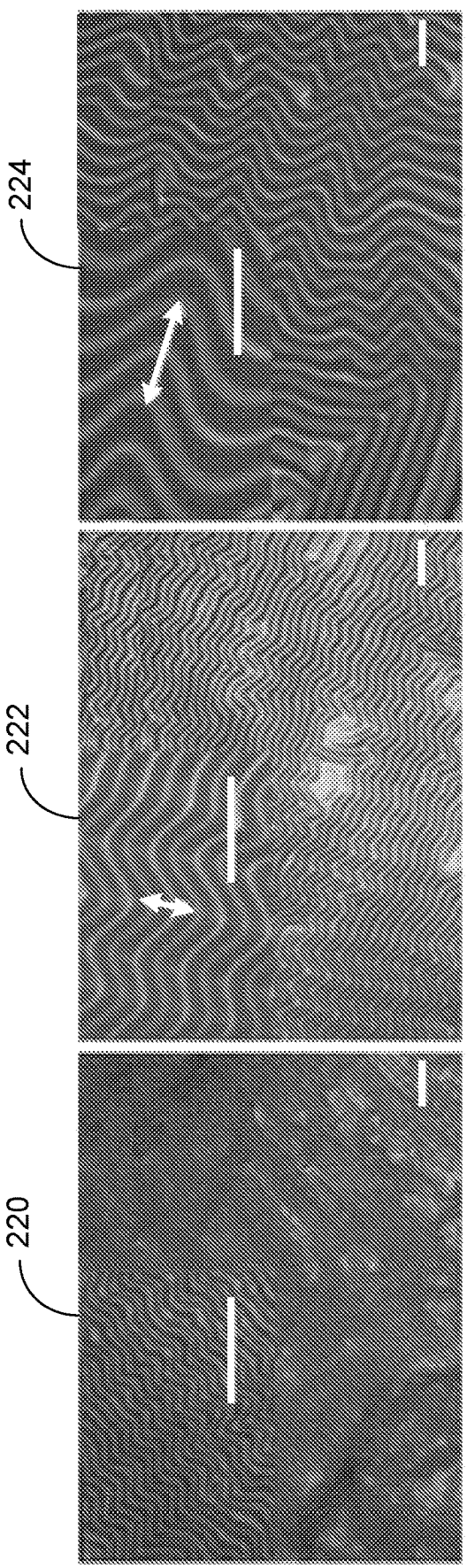
FIGS. 2A-2O show optical microscope and profilometer images of copper current collectors during and after lithium plating.
FIGS. 2P-2R show wavelength and amplitude values after lithium plating for copper current collectors with different thicknesses.

When lithium is electroplated on a thin metal current collector supported by a soft substrate, the compressive stress in lithium is transferred to the thin metal current collector, thereby causing wrinkles in the metal current collector, which may evolve from one-dimensional (1D) wrinkle patterns to two-dimensional (2D) wrinkle patterns. The soft substrate may be flexible or elastic. Suitable materials for the soft substrate include materials (e.g., rubber materials) having a modulus in a range of 100 kPa to 100 MPa, such as silicone, polyurethane, natural rubber, nitrile, ethylene-propylene, and styrene-butadiene. The soft substrate may be three-dimensional (3D) and define pores. A dimension of the pores is typically in a range of 5 nm to 500 µm. A metal current collector may be formed on surfaces of the pores. A thickness of the metal current collector is typically in a range of 50 nm to 1 µm. Suitable metals for the current collector include copper, nickel, iron, silver, platinum, and gold. A height of the wrinkles is typically in a range of 100 nm to 20 µm. A separation of directly adjacent wrinkles is typically in a range of 100 nm to 1000 µm. The height of the wrinkles, the separation of directly adjacent wrinkles, or both may be substantially uniform. A thickness of the lithium layer is typically in a range of 50 nm to 20 µm.

FIG. 1A depicts plating of lithium 100 on a copper thin film 102 disposed on a soft substrate 104. In one example, soft substrate 104 is polydimethylsiloxane (PDMS). 1D wrinkles 106 or 2D wrinkles 108 may be formed in copper thin film 102 due to the compressive stress generated during the lithium plating. Similar wrinkling patterns can be generated by using temperature mismatch and mechanical force. The surface wrinkling releases the electroplating-induced stress. With the help of stress relaxation, a uniform plating may be achieved. As depicted in FIG. 1B, lithium 100 penetrates the solid electrolyte interphase (SEI) 110, and the soft electrode releases compressive stress, and thus mitigating lithium dendrite growth. As depicted in FIG. 1C, however, compressive stress causes the generation of lithium dendrites 112 on a hard substrate 114 (e.g., copper foil) during lithium plating. Thus, when the electroplating-induced compressive stress in lithium is not released, stress-driven morphological instability causes lithium protrusions to form on an initially flat electrode surface, followed by the disruption of the SEI 110 by lithium protrusions and consequently high local electroplating flux, amplifying the instability and causing the lithium protrusions to further grow into dendrites 112.

Figure 2P:
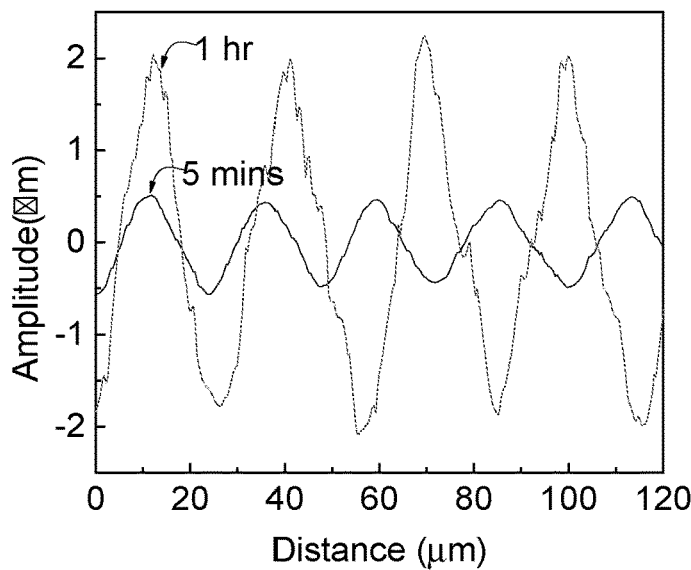
Figure 2Q:
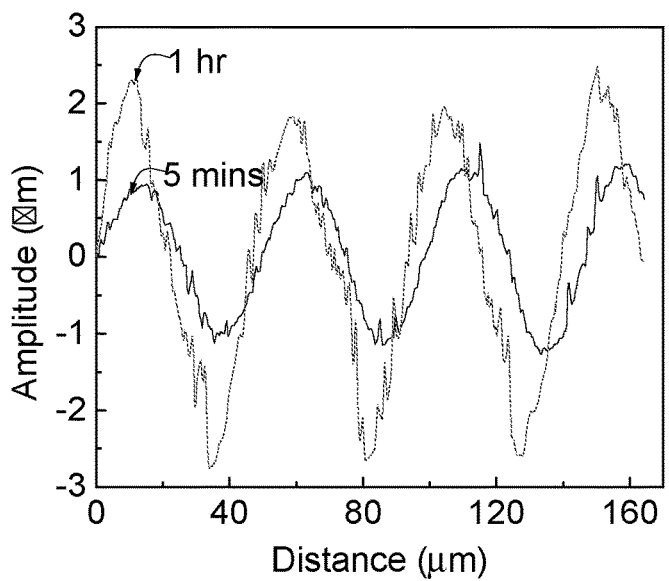
Figure 2R:
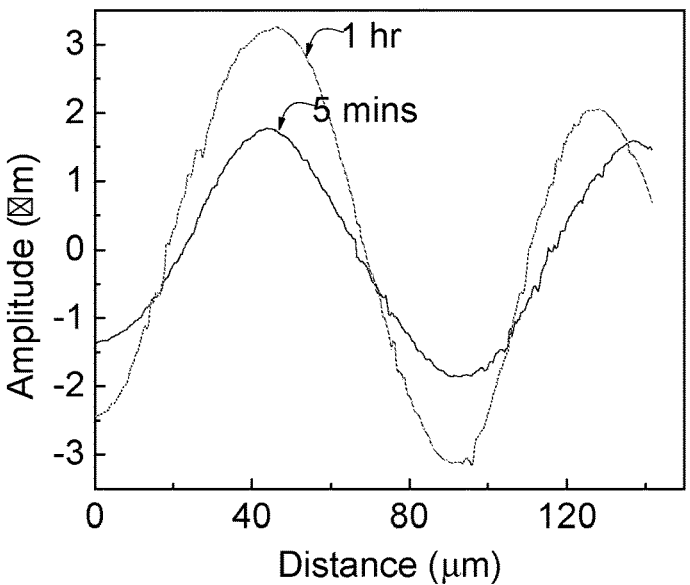

In one example, such as that depicted in FIG. 1A, PDMS is a soft electrode, copper thin film a current collector, lithium foil is a counter electrode, and 1M LiPF$_6$ in diethyl carbonate:dimethyl carbonate:ethylene carbonate (DC:DMC:EC) (1:1:1) is an electrolyte. Other appropriate materials may be used in other embodiments. The in-situ microscope and ex-situ profilometer images of the evolution of the electroplated lithium on copper thin films with different thickness (200 nm, 400 nm, and 800 nm) on PDMS electrodes, under a current density of 1 mA cm$^{-2}$ are shown in FIGS. 2A-2O. In order to perform the in-situ microscope observation, the electrodes were placed in a customized coin cell with glass window on the back. The electroplating behavior was observed under an optical microscope through the glass window and transparent PDMS. FIGS. 2A-2C show flat copper films having a thickness of 200 nm, 400 nm, and 800 nm, respectively. FIGS. 2D and 2G show 1D and 2D wrinkles formed in the copper film of FIG. 2A. FIGS. 2E and 2H show 1D and 2D wrinkles formed in the copper film of FIG. 2B. FIGS. 2F and 2I show 1D and 2D wrinkles formed in the copper film of FIG. 2C. All scale bars in FIGS. 2A-2I represent 100 µm. The initially flat copper thin films 200, 204, and 206 in FIGS. 2A-2C, respectively, wrinkle upon lithium electroplating, and the wrinkle patterns evolve from 1D patterns 210, 212, and 214 in FIGS. 2D-2F, respectively, to 2D patterns 220, 222, and 224 in FIGS. 2G-2I, respectively. FIGS. 2G-2I show 2D wrinkles with wavelengths similar to those of 1D wrinkles after 1 hour of lithium plating for all three copper current collectors. The wrinkle wavelengths are approximately 25 µm, 50 µm and 100 µm, respectively. All experiments were carried out using a current density of 1 mA/cm$^2$. Copper surface profiles after 5 minutes and 1 hour of lithium plating are shown in FIGS. 2J-2L and FIGS. 2M-2O, respectively. FIGS. 2P-2R show wavelength and amplitude values after 5 minutes and 1 hour of lithium plating for the three copper current collectors with different thicknesses.

These observations indicate the presence of the electroplating-induced compressive stress in lithium and the subsequent wrinkling on soft electrodes. The emerging of 1D wrinkle is a transient process that happens once the compressive force exerted from the electroplated lithium to the thin copper current collector exceeds the critical force for wrinkles, while the evolution from the 1D to 2D wrinkle patterns is a gradual process in which the 1D wrinkle patterns gradually bend as further lithium electroplating and thus further compressive force act on the thin copper current collector. It is also found that during the wrinkle evolution as lithium is continuously electroplated on copper thin film, wrinkle wavelength remains almost unchanged and is linearly dependent on the copper thickness. For example, for 200 nm, 400 nm, and 800 nm-thick copper, the average wavelengths are approximately 25 µm, 50 µm, and 100 µm, respectively, which can be understood by the small deformation wrinkle theory where the wrinkle wavelength is independent of the compressive strain but linearly depends on the thin film thickness. The phenomenon is apparently different from that of silicon thin film lithiation on PDMS, in which silicon wrinkles evolve from 1D to 2D with continuous wavelength decrease due to the large deformation (up to ~400%) during lithium insertion into silicon and can be explained by the large deformation theory.

PDMS (Sylgard 184, Dow Corning) was prepared by mixing the base and curing agent (10:1 by weight), debubbling, and curing at 80° C. for 2 hours to polymerize and then cutting into 1 cm by 1 cm squares. After that, chromium (5 nm) and copper (200 nm, 400 nm, or 800 nm) were deposited in sequence on the surface of the PDMS substrate using sputter PVD method (3 mTorr, 100 Watts for both materials). The prepared soft electrode was laminated with an ion-permeable polymer (polypropylene Celgard 2500) as separator and Li metal (0.17 mm, MTI Corp.) as reference and counter electrode. Commercially widely used 1 M LiPF$_6$ in ethylene carbonate (EC):dimethyl carbonate (DMC):diethyl carbonate (DEC) (1:1:1) (MTI Corp.) electrolyte was adopted as the electrolyte for 2D electrode test. 1 M Lithium bis(trifluoromethanesulfonyl)imide (LiTSFI) in 1,3-dioxolane:1,2 dimethoxyethane (DOL:DME) (1:1) with 1% LiNO$_3$ electrolyte was used for the synergetic combination. For in-situ optical microscopy observation, the sandwiched structure was loaded in a customized coin cell with a transparent glass window. For electrochemical testing, the sandwiched structure was sealed and vacuumed in an aluminized polyethylene (PE) pouch (Sigma-Aldrich). For the half cell, the Coulombic efficiency test begins with the cycling from 0 to 1 V at 50 µA to remove surface contamination and stabilize the SEI for 5 cycles. Then a fixed amount of lithium was plated on the electrodes at different current densities for 1 hour, followed by lithium stripping to 1 V. For the full cell testing, LiFePO$_4$ was used as the cathode material. The LiFePO$_4$ electrode was prepared by mixing LiFePO$_4$ powder, polyvinylidene fluoride (PVDF) and conductive carbon additives (mass ratio: 8:1:1) in N-methyl-2-pyrrolidone (NMP) and then casting the mixture on an aluminum foil followed by drying in a vacuum oven for 12 h. The average mass loading of LiFePO$_4$ in the electrode was about 1.8 mg cm$^{-2}$. The electrode was first assembled into a half cell using a lithium foil as counter electrode. After depositing 2 mAh cm$^{-2}$ of lithium metal onto the current collector, the cell was disassembled and lithium anode was further reassembled into a full cell against LiFePO$_4$ cathode. The electrolyte was 1 M LiTFSI in DOL:DME (1:1) with 1% LiNO$_3$ as an additive. The cells were galvanostatically cycled between 2.5 and 4.1 V at 1 mA cm$^{-2}$. All assembly manipulations were performed in an argon-filled glovebox.

In-situ optical microscopy observation was carried out using a customized coin cell with a transparent glass window at the back. Because of the transparence of the glass and PDMS, the behavior of copper thin film was captured under an optical microscope (Nikon eclipse 1v100, 10× objective). A current density of 1 mA/cm$^2$ and a plating time of 1 hour were adopted for 200 nm, 400 nm, and 800 nm thick copper samples. 0.1 mA/cm$^2$ and a plating time of 3 hours were adopted to test the low current density behavior of copper during lithium plating. 5 mA/cm$^2$ and a plating time of 1 hour were used to test the high current density response of copper. Both low current density and high current density experiments were carried out on 800 nm samples.

For ex-situ profilometer experiments, the samples were charged using 1 mA/cm$^2$ for 5 minutes and 1 hour. Because lithium is highly air-sensitive and the oxidation changes the morphology of the lithium-covered plated surface, directly profiling on the electrode is difficult. However, it was observed that after the removal of lithium by deionized (DI) water and dried, the wrinkled copper film would not fully recover the initial flat state, possibly because of the plastic deformation that occurred for copper during lithium plating. This phenomenon was employed to observe the amplitude change of copper wrinkles after removal of lithium for a different state of plating.

After plating of 5 minutes and 1 hour with a current density of 1 mA/cm$^2$, the samples were taken out from the cells and rinsed by an anhydrous dimethyl carbonate (DMC) for a few times to remove the residual electrolyte on the surface of the electrode. During transfer of the samples, care was taken to minimize the oxidation of the samples. The electrodes were first mounted on a scanning electron microscope (SEM) stub and then sealed inside an aluminized polyethylene (PE) packaging bag. All these procedures took place in the glovebox. Finally, the PE bag with the electrode was cut open and quickly transferred to SEM chamber. The total exposure to air time was less than 5 seconds.

To further investigate the electroplating behavior and wrinkle evolution, samples with different electroplating time (5 minutes and 1 hour) for all the three copper thicknesses (i.e., 200 nm, 400 nm, and 800 nm) were examined under ex-situ optical profilometer. The results (FIGS. 2J-2O) show that the wavelength approximately does not change with the electroplating time but depends essentially on the copper thickness. However, the wave amplitudes become larger with increased electroplating time. The wrinkling behavior can be explained by the small deformation mechanics model, where the amplitude A and wavelength λ are given by $$A = h\sqrt{4\left[\frac{E_f(1-v_s^2)}{3E_s(1-v_f^2)}\right]^{\frac{2}{3}}\varepsilon_{exerted} - 1} \text{ and } \lambda = 2\pi h\left[\frac{E_f(1-v_s^2)}{3E_s(1-v_f^2)}\right]^{\frac{1}{3}}.$$

Here h is the copper thin film thickness; $E_f$ and $E_s$ are the elastic modulus of the copper film and PDMS; respectively, $\varepsilon_{exerted}$ is the exerted strain from the electroplated lithium to the copper thin film. The model shows that as the increase of the exerted strain from electroplated lithium (i.e., increasing the electroplating time), buckling amplitude A increases and wavelength λ remains constant, which agrees with the experiments. More quantitatively, using the following material properties of the PDMS and copper, $E_s$=2.6 MPa, $v_s$=0.48, $E_f$=110 GPa, $v_f$=0.34, the model gives buckling wavelengths of 29.0 μm, 58.0 μm and 116.0 μm for 200 nm, 400 nm, and 800 nm copper thin films, respectively, which reasonably agrees well with the measured mean wavelengths (25 μm, 50 μm, and 100 μm). Using the measured amplitude, the exerted strain and thus the stress in electroplated lithium can be obtained.

Figure 3A:
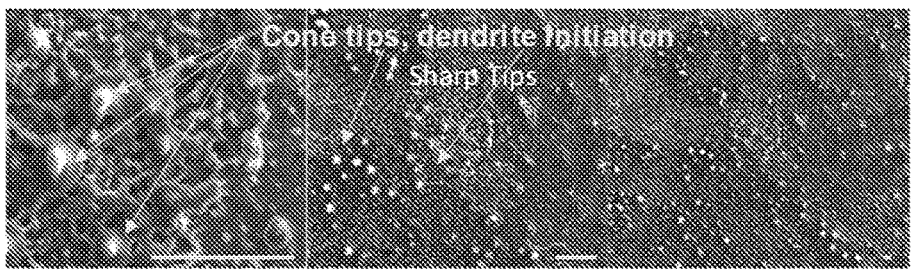
FIGS. 3A-3F are scanning electron microscope images of electrochemically plated lithium.
Figure 3B:
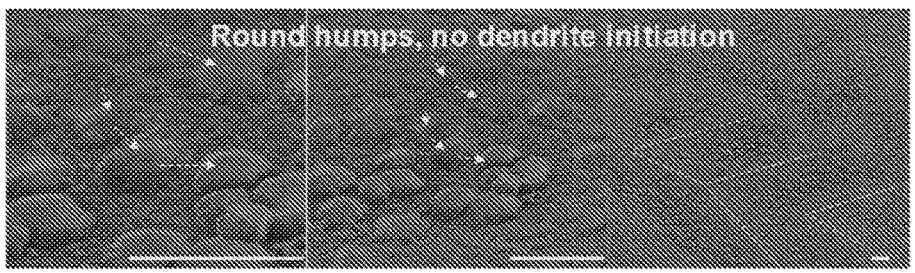
Figure 3C:
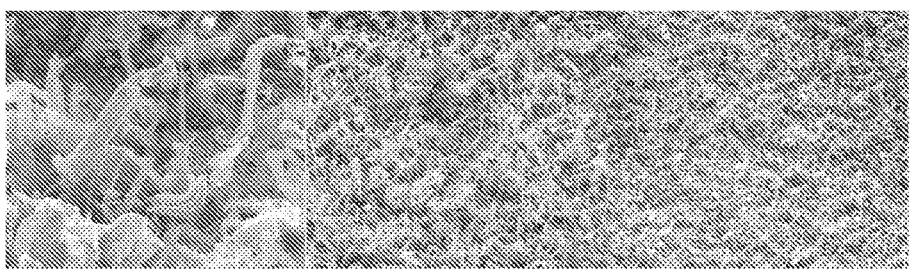
Figure 3D:
Figure 3E:
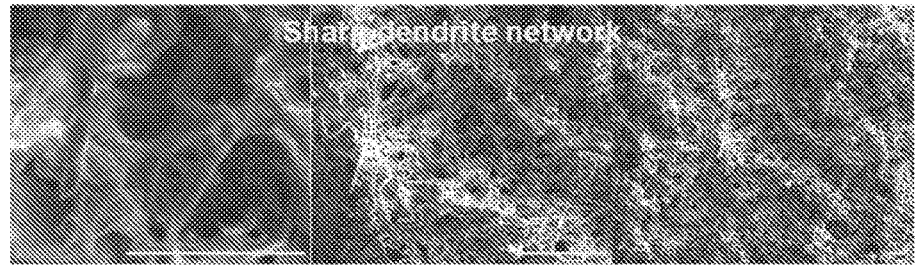
Figure 3F:
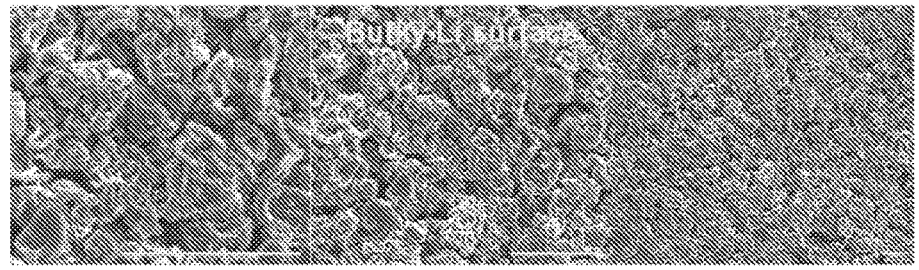

Lithium morphology was examined by electroplating on two different electrodes for comparison, namely copper thin film on a PDMS electrode that has a stress relaxation mechanism, and copper foil that is commercially used as anode current collector in lithium-ion batteries and used in lithium deposition research as a hard electrode without stress relaxation. FIGS. 3A-3F show scanning electron microscope (SEM) images of electrochemically plated lithium at early plating stage (5 minutes) and after 1 hour with a current density of 1 mAh cm$^{-2}$. Significantly different lithium morphologies between using a hard electrode (copper foil) and a soft electrode (800 nm copper on PDMS) were observed. After 5 minutes of plating on copper foil (FIG. 3A), it can be observed that many cone-shaped lithium tips have formed and the overall lithium plating is uneven due to the localized lithium accumulation on these tips. For the soft copper/PDMS electrode (FIG. 3B), lithium growth starts with small lithium flat "pads," and these flat "pads" extend and eventually form bigger round humps. No sharp lithium tips can be found. Also, these humps can be fairly uniformly distributed on the soft electrode, which seems to suggest no localized lithium concentration. The dashed lines in FIG. 3B highlight the wrinkle profile. After plating for one hour on hard copper foil (FIG. 3C), large amount of lithium dendrites with random dimensions and sharp tips formed. Very differently for soft copper/PDMS electrode after one-hour plating (FIG. 3D), the early formed humps connected to each other, uniformly grew and formed a smooth, continuous lithium film. Even after 100 cycles of plating and stripping, lithium morphologies on hard copper foils and soft copper thin film/PDMS electrodes are still different. As shown in FIG. 3E, dense lithium dendrite "forests" formed on hard electrodes; while a relatively flat lithium surface remained on soft electrodes, indicating that stress relaxation plays a role on lithium morphology during plating/stripping. All scale bars in FIGS. 3A-3F represent 10 μm. All experiments were carried out using a current density of 1 mA/cm$^2$.

In FIGS. 2A-2O and 3A-3F, PDMS stubs were used as the soft electrodes. Additional experiments have been conducted to examine the stress relaxation effect compared with hard copper. Results show that copper/PDMS soft electrodes outperform copper foil. Stress relaxation may be increased by (a) increasing surface area of the PDMS and thus reducing the plating current and lithium thickness, and (b)

synergetic combination between the soft electrodes and new electrolyte additives. To achieve this improvement, a 3D soft scaffold was prepared.

FIGS. 4A-4C illustrate the fabrication process of the 3D soft scaffold. FIG. 4A depicts sugar cube 400 with sugar grains 402 used as a pore generation template. Liquid PDMS 404 (Sylgard 184 with 10:1 ratio) mixed with Silwet as the surfactant to change the hydrophobicity was allowed to infiltrate into porous sugar cube 400. The PDMS was cured and the sugar was washed away, leaving 3D, porous, hydrophilic PDMS 406, depicted in FIG. 4B. Then electroless deposition was applied to conformally and uniformly coat copper as current collector throughout the interconnected 3D porous PDMS. FIG. 4C depicts copper coating 408 on the PDMS scaffold of FIG. 4B. Thus a 3D soft copper-PDMS scaffold (Cu@PDMS) was fabricated. Electroless deposition is a non-galvanic plating method that does not require any external electrical power and is typically used for electroless plating of metals on nonconductive materials. The SEM image shows the average pore size is in a range between 50 μm and 200 μm, and the wall thickness is around 50 μm.

Figure 4F:
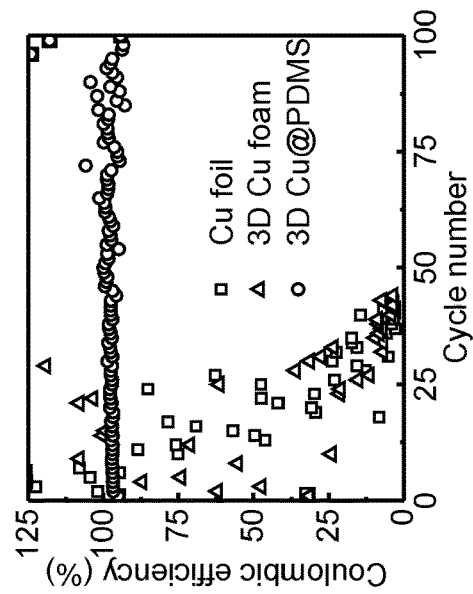
FIGS. 4D-4F show Coulombic efficiency (CE) versus cycle number for various electrodes.
Figure 4E:
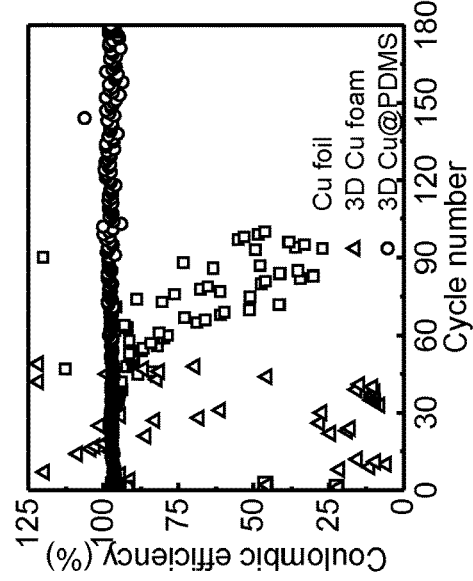
Figure 4D:
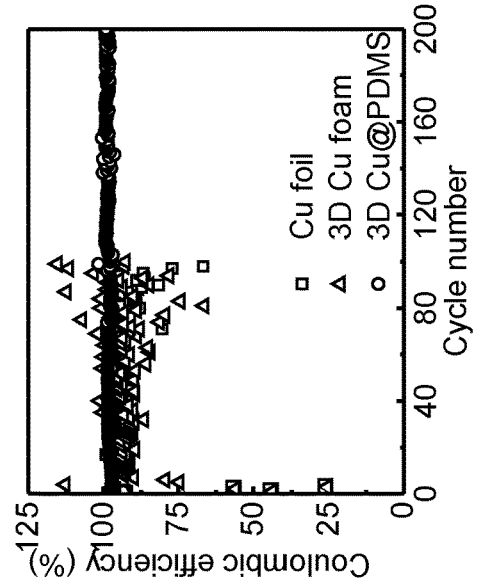

The cycling Coulombic efficiencies (CE) of copper foil, 3D Cu@PDMS scaffolds as well as a commercial 3D copper foam electrode of similar pore size as the 3D copper-PDMS scaffolds were tested. The CE test began with the galvanostatically cycling of the electrodes at 50 μA from 0 to 1 V to remove surface contamination and stabilize the SEI for 5 cycles. Then 1 mAh cm$^{-2}$, 2 mAh cm$^{-2}$ and 3 mAh cm$^{-2}$ of lithium were plated at current densities of 1 mA cm$^{-2}$, 2 mA cm$^{-2}$ and 3 mA cm$^{-2}$ followed by lithium stripping to 1 V for all the three electrodes. FIGS. 4D-4F show that the 3D Cu@PDMS soft electrode had significantly improved performance compared to those of copper foil and 3D copper foam electrodes. Under a current density of 1 mA cm$^{-2}$ (FIG. 4D), Cu@PDMS has a stable CE for more than 200 cycles with an average CE magnitude to be about 98%, while both copper foil and 3D copper foam electrodes have lower CE magnitude close to 95% and 90% accordingly and become unstable in 90 cycles. For higher current density of 2 mA cm$^{-2}$ (FIG. 4E), the Cu@PDMS soft electrode still achieves more than 200 stable cycles with CE magnitude close to 98%, while copper foil has less than 50 stable cycles and 3D copper foam has rather random CE value from the beginning. Especially, even under large areal current density of 3 mA cm$^{-2}$ (FIG. 4F), the Cu@PDMS soft electrode still has fairly stable CE for about 100 cycles, while both copper foil and 3D copper foam has no stable CE from the beginning. By replacing the hard 3D copper skeleton with soft 3D copper skeleton, even if pore size is larger than 100 μm, the CE is stable for more than 200 cycles.

Figure 4G:
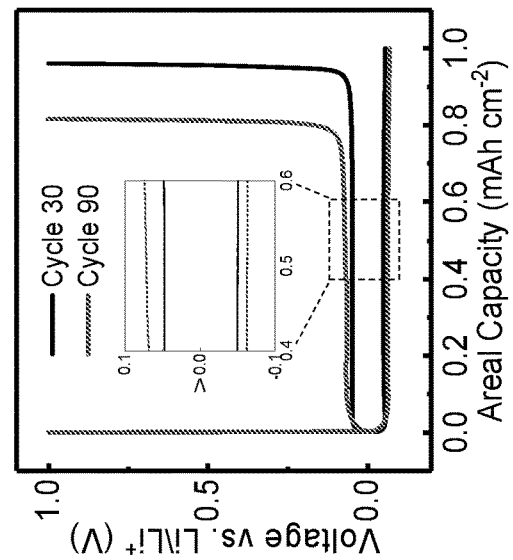
FIGS. 4G-4I show the voltage profile of these electrodes under a current density of 1 mA $cm^{-2}$.
Figure 4H:
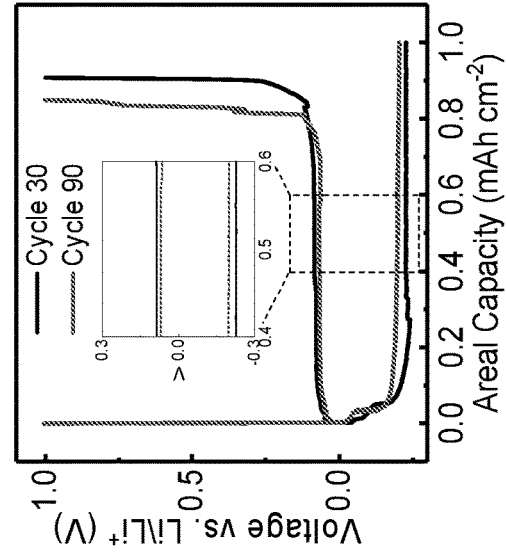
Figure 4I:
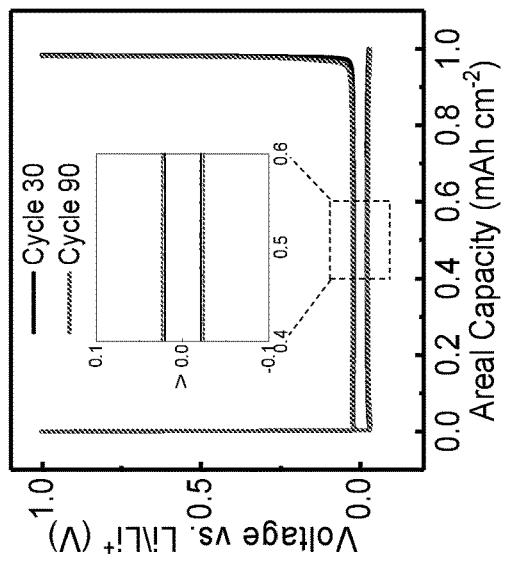
Figure 4K:
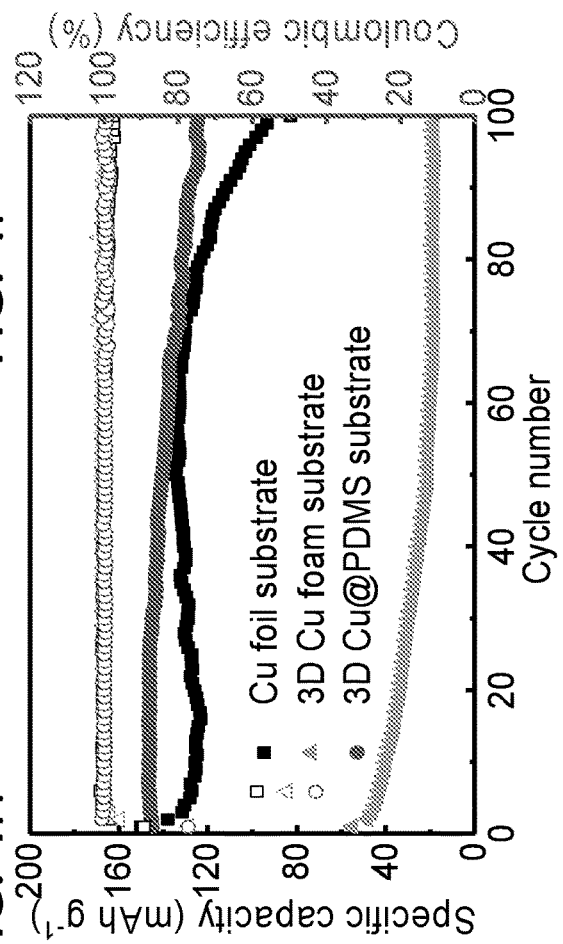
FIGS. 4J and 4K show voltage hysteresis and specific capacity of these electrodes, respectively, as a function of cycle number.
Figure 4J:
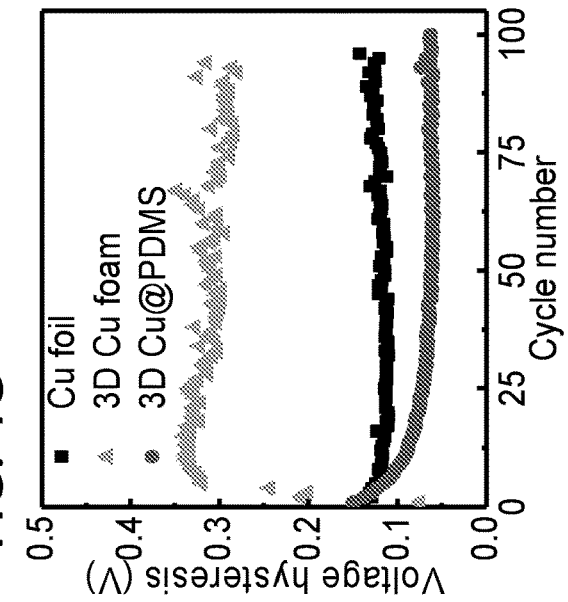

The voltage profiles of these three electrodes under the current density of 1 mA cm$^{-2}$ are shown in FIGS. 4G-4I. The lithium plating plateau voltage increases from 50 mV to 63 mV for the copper foil electrode (FIG. 4G) and increase from 21 mV to 24 mV for the 3D Cu@PDMS electrode from 30th to 90th cycle (FIG. 4I). The lithium plating plateaus for copper foam (FIG. 4H) is more than 200 mV, which is significantly larger than that for the copper foil and the 3D Cu@PDMS from 30th to 90th cycle. Also, from the voltage hysteresis of the three electrodes in FIG. 4J, it is observed that 3D Cu@PDMS electrode has the smallest and most stable hysteresis (60 mV), while the copper foil electrode has a hysteresis larger than 120 mV and the copper foam has a hysteresis larger than 300 μV. The low plateau voltage increment and small hysteresis of the 3D Cu@PDMS soft electrode can explained by the formation of more stable SEI resulting from the relaxation of stress due to the soft substrate. FIG. 4J shows specific capacity versus cycle number for the three electrodes.

To achieve a symmetrical system between copper foil and lithium, an excess of lithium (5 mAh cm$^{-2}$) was plated on both copper foil and Cu@PDMS electrodes by 1 mA cm$^{-2}$ plating and 0.5 mA stripping for 10 cycles. After that, a current density of 0.25 mA cm$^{-2}$ was used for both plating and stripping for a total of 100 cycles. From the voltage-time profiles, it was observed that voltage fluctuation was severe after 60 cycles for copper foil while the soft Cu@PDMS electrode exhibited stable cycling. The same trend was seen from the hysteresis curves of this test. The cycling Coulombic efficiencies (CE) of the copper foil hard and Cu@PDMS soft electrodes were also examined. The CE of the copper foil electrode dropped before the 60th cycle, which can be ascribed to short circuit in the cell caused by sharp dendrites, while for the Cu@PDMS electrode, no sudden drop of CE was observed for over 100 cycles under a current density of 1 mA cm$^{-2}$ and 1 hour plating and stripping to 1V for each cycle. It can be also found that when using commercial electrolyte (1M LiPF$_6$ in DC:DMC:EC (1:1:1)), though Cu@PDMS electrode has a better CE performance than copper foil electrode, CE is still fluctuating and the magnitude is as low as 90%. To further improve the CE performance, 1 M lithium bis(trifluoromethanesulfonyl)-imide (LiTFSI) in cosolvent of 1,3-dioxolane (DOL) and 1,2-dimethoxyethane (DME) (1:1) with 1% LiNO$_3$ as electrolyte was examined for both electrodes. Both electrodes have improved CE stability and CE values, and the Cu@PDMS electrode outperformed the copper foil electrode.

Figure 5A:
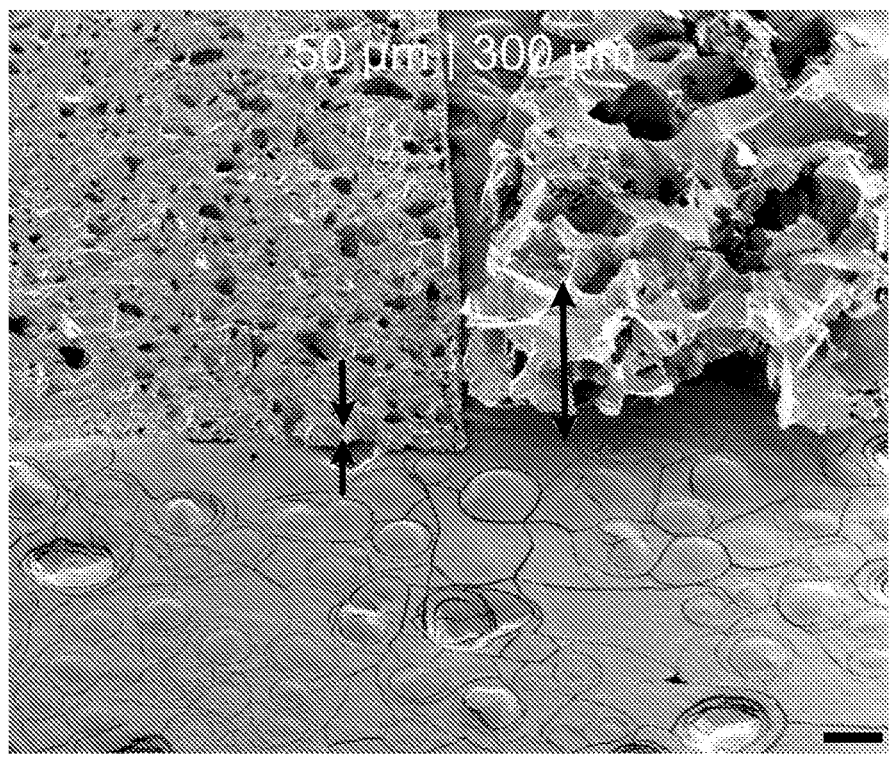
FIGS. 5A and 5B are SEM images of 300 μm-thick and 50-μm thick 3D Cu@PDMS substrates.
Figure 5B:
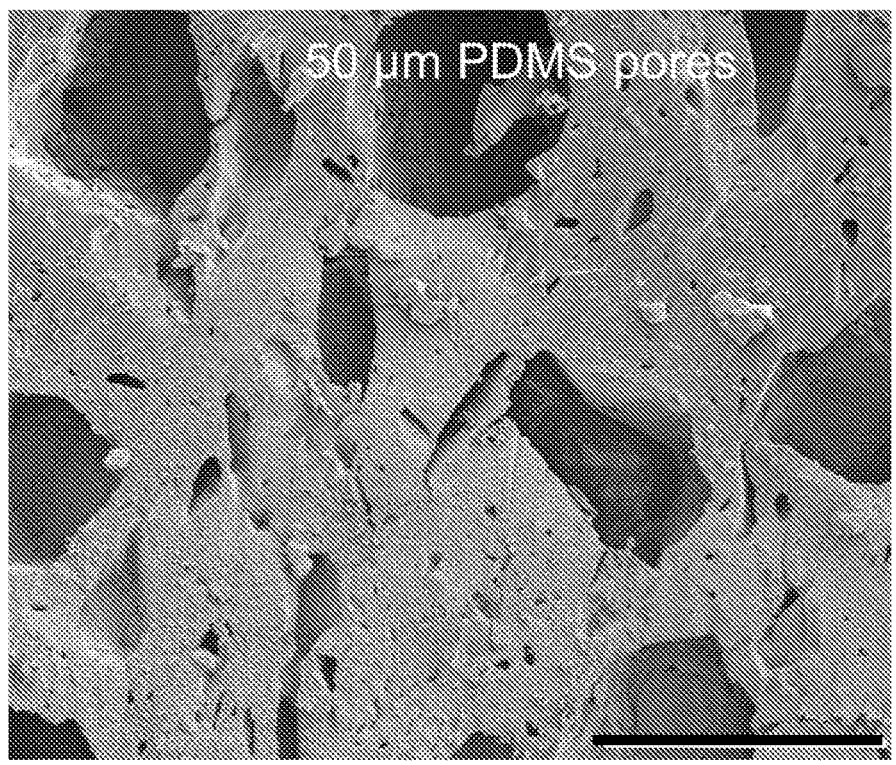

In another example, 3D porous PDMS was prepared by mixing the base (30 g), curing agent (3 g) and glucose (15 g, Aladdin), stirring for 10 minutes, and then curing at 80° C. for 2 hours. After solidification, the PDMS contained glucose and was cut into slices with a thickness of 50 μm with an Ultra-Thin Semiautomatic Microtome (Leica RM2245). After that, the slices were placed in deionized water and ultrasonic treatment for 4 hours to completely remove the glucose. By using glucose, which has a smaller grain size (tens of microns) than that of the sugar cubes in the previous example (hundreds of microns), combined with the Ultra-Thin Semiautomatic Microtome, the 3D porous PDMS has been reduced to as thin as 50 μm, and the pore size has also been reduced from 200~300 μm to 1050 μm. FIG. 5A shows a comparison of porous PDMS substrates with a thickness of 300 μm (right) and 50 μm (left). FIG. 5B shows a top view of a 50 μm-thick porous PDMS substrate with the reduced pore size. The scale bars in FIGS. 5A and 5B are 100 μm.

Figure 6A:
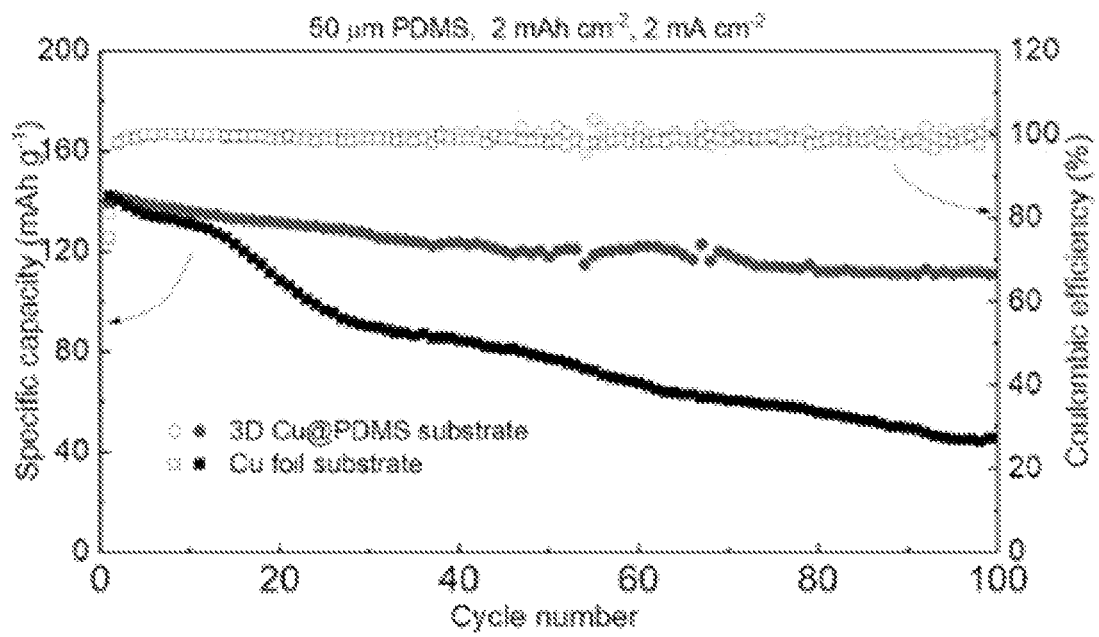
FIGS. 6A and 6B show full cell cycling performance of a 50 μm-thick 3D Cu@PDMS substrate with different capacity loadings.
Figure 6B:
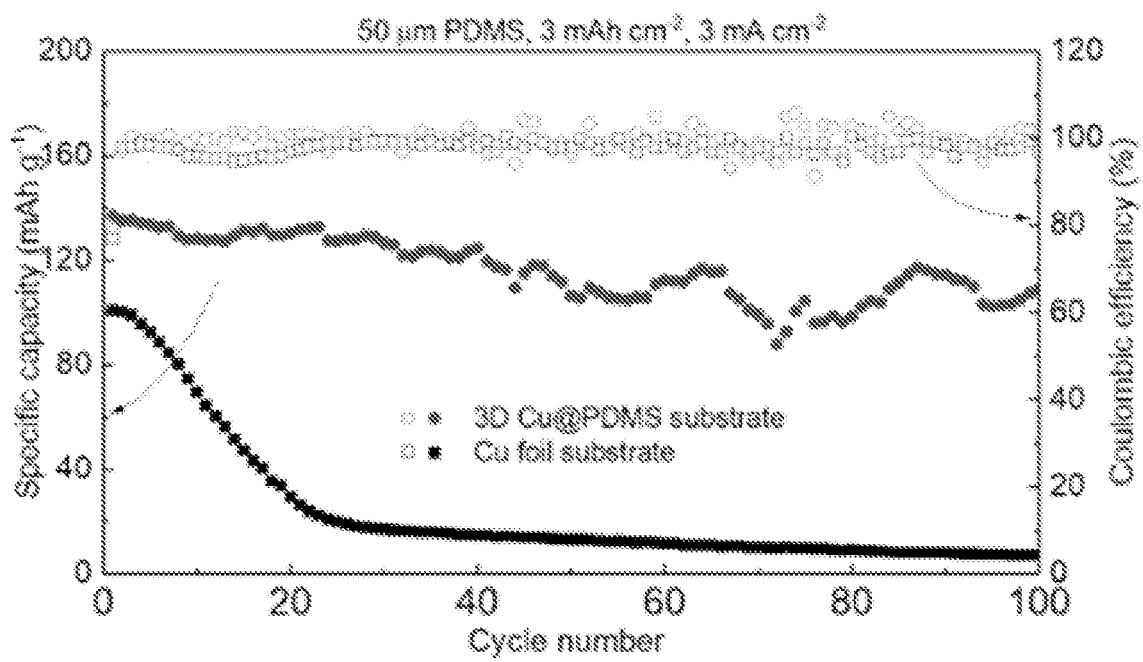

Full cells with elevated capacity loading of 2 mAh cm$^{-2}$ and 3 mAh cm$^{-2}$ were tested under a current density of 2 mA cm$^{-2}$ and 3 mA cm$^{-2}$ with a 3D Cu@PDMS electrode formed with glucose and a copper foil electrode. In fabricating the full cells, 2 mAh cm$^{-2}$ and 3 mAh cm$^{-2}$ Li was predeposited on both electrodes. As seen from FIGS. 6A and 6B, the 3D Cu@PDMS electrode formed with glucose outperforms the copper foil electrode for both mass loadings. For 2 mAh cm$^{-2}$ batteries in FIG. 6A, the capacity of 3D Cu@PDMS retains over 80% by decreasing from 138 mAh g$^{-1}$ to 111 mAh g$^{-1}$ with an average Coulombic efficiency greater than 99.5% for 100 cycles. The capacity in the case of copper foil drops from 142 mAh g$^{-1}$ to 46 mAh g$^{-1}$ with a retention rate of only 32%. For 3 mAh cm$^{-2}$ batteries in FIG. 6B, the capacity of 3D Cu@PDMS retains over 78% by decreasing from 137 mAh g$^{-1}$ to 108 mAh g$^{-1}$ with an average Coulombic efficiency greater than 99.5% for 100 cycles, and the capacity for copper foil drops from 101 mAh g$^{-1}$ to 7 mAh g$^{-1}$ with a retention rate of only 7%. The degradation for copper foil is believed to be due to highly nonuniform deposition of lithium under the high current density of 3 mA cm$^{-2}$. The tested lithium electrode on the 3D Cu@PDMS soft substrate displays a relatively low Coulombic efficiency in the first cycle (FIGS. 6A and 6B), which is also observed for other types of 3D current collectors and likely contributed by severe SEI formation due to the large surface area of deposited lithium in the 3D structures. This issue may be alleviated by the pre-deposition of excess lithium or the use of synergistic electrolyte additives such as lithium polysulfide combined with lithium nitrate, which has been shown to increase the initial Coulombic efficiency of the lithium anode in DOL:DME from 71% to 93%.

Figure 7A:
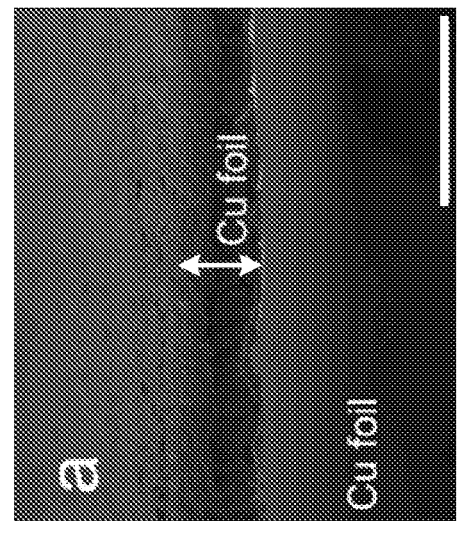
FIGS. 7A-7F show thickness changes of a 3D 50 μm-thick Cu@PDMS electrode and a planar lithium metal anode upon cycling.
Figure 7B:
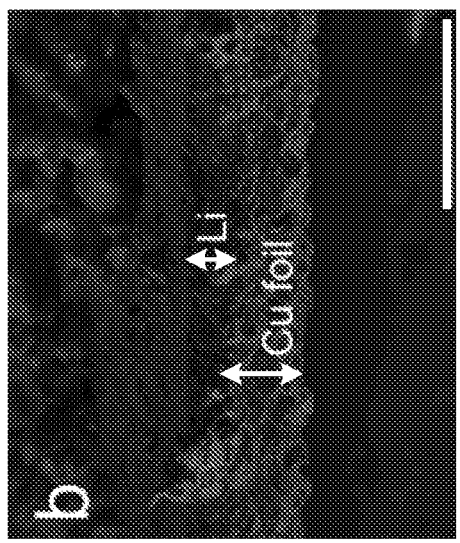
Figure 7C:
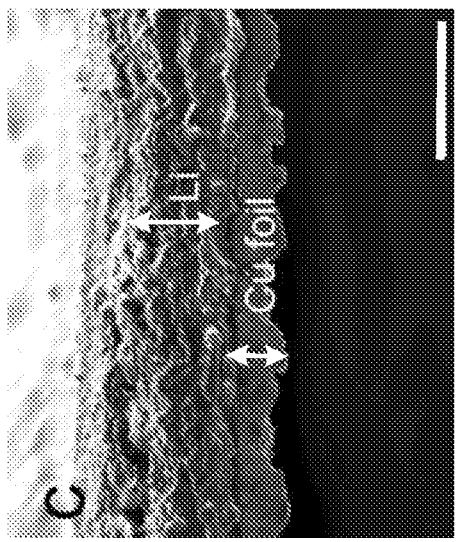
Figure 7D:
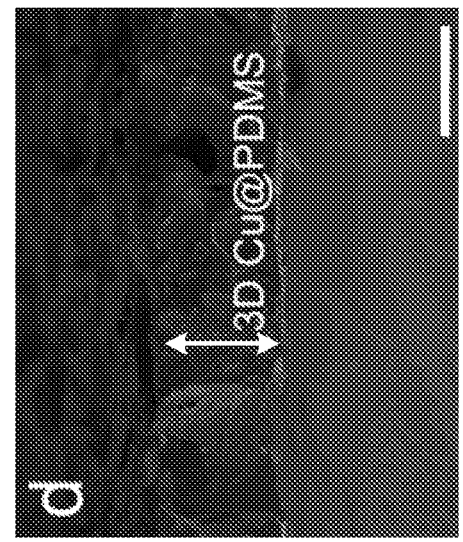
Figure 7E:
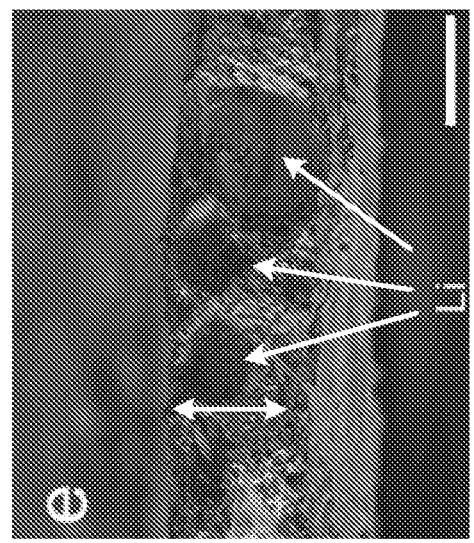
Figure 7F:
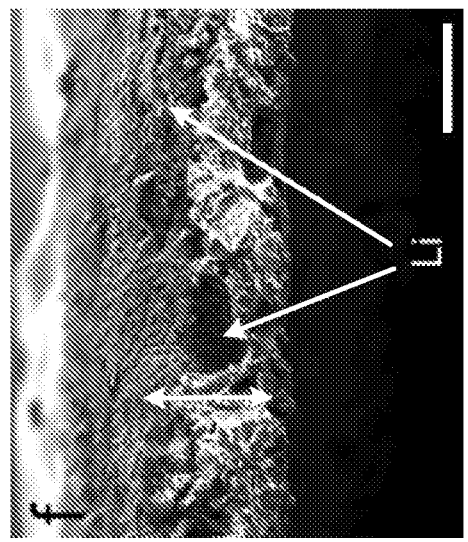

The 3D Cu@PDMS electrode can maintain a stable thickness over repeated cycling as compared with the planar copper current collector. FIGS. 7A-7C show cross-sectional SEM images of a planar copper current collector in its pristine state, after first lithiation, and after 100 cycles, respectively. The thickness of the lithium layer plated on a planar copper current collector increased more than two-fold after 100 cycles. FIGS. 7D-7F show cross-sectional SEM images a 3D Cu@PDMS substrate in its pristine state, after first lithiation, and after 100 cycles, respectively. The 3D Cu@PDMS electrode thickness shows little change after the first lithiation, and increases by less than 15% after 100 cycles, which confirms that the majority of plated lithium is accommodated inside the pores of the 3D structure. The scale bar in FIGS. 7A-7F is 50 μm.

Figure 8:
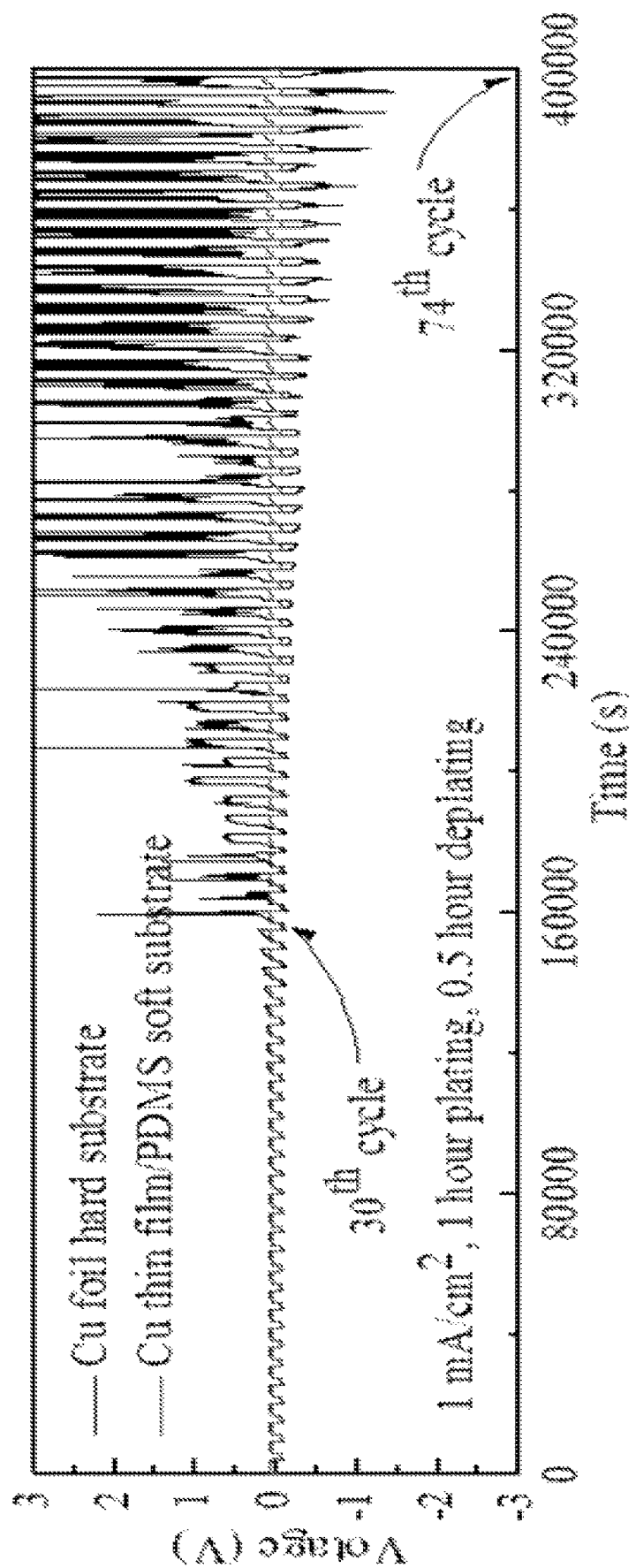
FIG. 8 shows electrochemical characterization of copper thin film/soft substrate current collector and a thick copper current collector.

FIG. 8 shows the electrochemical characterization of a copper thin film/PDMS current collector compared with the same type of asymmetric plating/stripping experiment on a thick copper current collector. While severe voltage fluctuation takes place after only 30 cycles for the copper foil substrate, the sample on the copper thin film/PDMS soft substrate exhibits a stable voltage profile and small polarization even after 74 cycles.

In some implementations, a battery includes two electrodes and an electrolyte in contact with the two electrodes. The first electrode may include lithium. The second electrode, as described herein, includes a soft substrate, a metal layer on the soft substrate, and a lithium layer formed on the metal layer. The metal layer includes wrinkles.

Only a few implementations are described and illustrated. Variations, enhancements and improvements of the described implementations and other implementations can be made based on what is described and illustrated in this document.

What is claimed is:

1. An electrode comprising:
a soft substrate;
a metal layer in direct contact with the soft substrate; and
a lithium layer formed directly on the metal layer, wherein the metal layer comprises wrinkles.

2. The electrode of claim 1, wherein the soft substrate is elastic.

3. The electrode of claim 1, wherein the soft substrate is flexible.

4. The electrode of claim 1, wherein a thickness of the metal layer is in a range of 50 nm to 1 μm.

5. The electrode of claim 1, wherein the metal layer comprises at least one of copper, nickel, iron, silver, platinum, and gold.

6. The electrode of claim 1, wherein the metal layer is formed on the soft substrate.

7. The electrode of claim 1, wherein the wrinkles are of a substantially uniform height, and the height is in a range of 100 nm to 20 μm.

8. The electrode of claim 1, wherein the wrinkles are separated by a substantially uniform distance, and the distance is in a range of 100 nm to 1000 μm.

9. The electrode of claim 1, wherein a thickness of the lithium layer is in a range of 50 nm to 20 μm.

10. The electrode of claim 1, wherein the wrinkles are one dimensional or two dimensional.

11. The electrode of claim 1, wherein the soft substrate is three dimensional.

12. The electrode of claim 11, wherein the soft substrate defines pores, and the metal layer is formed on surfaces defining the pores.

13. The electrode of claim 1, wherein the soft substrate comprises at least one of polydimethylsiloxane, silicone, polyurethane, natural rubber, nitrile ethylene-propylene, and styrene-butadiene.

14. The electrode of claim 1, wherein the soft substrate has an elastic modulus in a range of 100 kPa to 100 MPa.

15. A method of fabricating an electrode, the method comprising:
forming a metal layer on a soft substrate; and
forming a lithium layer on the metal layer, wherein forming the lithium layer on the metal layer yields uniform wrinkles in the metal layer.

16. A battery comprising
a first electrode;
a second electrode comprising:
a soft substrate;
a metal layer in direct contact with the soft substrate; and
a lithium layer formed on the metal layer, wherein the metal layer comprises wrinkles; and
an electrolyte in contact with the first electrode and the second electrode.

17. The battery of claim 16, wherein the first electrode comprises lithium.

18. The battery of claim 16, wherein the metal layer comprises at least one of copper, nickel, iron, silver, platinum, and gold.

19. The battery of claim 16, wherein the wrinkles are one dimensional or two dimensional.

20. The battery of claim 16, wherein the soft substrate is three dimensional.

21. The battery of claim 20, wherein the soft substrate defines pores, and the metal layer is formed on surfaces defining the pores.

22. The battery of claim 21, wherein a dimension of the pores is in a range of 5 nm to 500 μm.

* * * * *